US012769078B2

(12) United States Patent
Wacinski et al.

(10) Patent No.: US 12,769,078 B2
(45) Date of Patent: Oct. 20, 2026

(54) APPARATUS FOR LAYING AN OPTIC CABLE INTO A DUCT

(71) Applicant: PLUMETTAZ HOLDING SA, Bex (CH)

(72) Inventors: Andrej Wacinski, Bex (CH); Fabrice Abbet, Massongex (CH); Roland Lobstein, Publier (FR)

(73) Assignee: PLUMETTAZ HOLDING SA, Bex (CH)

(*) Notice: Subject to any disclaimer, the term of this patent is extended or adjusted under 35 U.S.C. 154(b) by 324 days.

(21) Appl. No.: 18/683,468

(22) PCT Filed: Aug. 17, 2022

(86) PCT No.: PCT/EP2022/072919
§ 371 (c)(1),
(2) Date: Feb. 13, 2024

(87) PCT Pub. No.: WO2023/021068
PCT Pub. Date: Feb. 23, 2023

(65) Prior Publication Data
US 2024/0353647 A1 Oct. 24, 2024

(30) Foreign Application Priority Data
Aug. 17, 2021 (CH) ................................ 70178/2021

(51) Int. Cl.
*H02G 1/02* (2006.01)
*G02B 6/50* (2006.01)
*G02B 6/52* (2006.01)

(52) U.S. Cl.
CPC *G02B 6/52* (2013.01); *G02B 6/50* (2013.01)

(58) Field of Classification Search
CPC .......... B65H 51/14; H02G 1/088; H02G 1/00; H02G 1/086; H02G 1/081
See application file for complete search history.

(56) References Cited

U.S. PATENT DOCUMENTS 3,881,647 A * 5/1975 Wolfe ...................... B66D 1/50
226/176
5,368,212 A 11/1994 Koch
(Continued)

FOREIGN PATENT DOCUMENTS

WO 2023021068 A1 2/2023

OTHER PUBLICATIONS

Foreign Communication from a Related Counterpart Application, International Search Report and Written Opinion dated Dec. 1, 2022, International Application No. PCT/EP2022/072919 filed on Aug. 17, 2022.

*Primary Examiner* — Lee D Wilson
(74) *Attorney, Agent, or Firm* — Conley Rose, P.C.

(57) ABSTRACT

An apparatus for laying an elongated element into a duct includes a driving unit with a two-belt conveyer for driving the elongated element into the duct, forming an inlet part into which the cable is inserted in the driving unit and an outlet part from which the optic cable is sent out of the driving unit, and a fiber protecting unit for the elongated element. The fiber protecting unit comprises at least one of a precise clamping force setting for setting a clamping force exerted by the two-belt conveyers, a non-parallel belt setting system for setting the two-belt conveyers in a non-parallel fashion, or stepped belts having a stepped contact surface.

11 Claims, 3 Drawing Sheets

(56) References Cited

U.S. PATENT DOCUMENTS

| | | | | |
|---|---|---|---|---|
| 6,012,621 | A | 1/2000 | Hoium et al. | |
| 6,179,269 | B1 * | 1/2001 | Kobylinski | H02G 1/08 254/134.3 R |
| 6,370,753 | B1 * | 4/2002 | Washburn | G02B 6/50 29/714 |
| 6,402,123 | B1 * | 6/2002 | Rivard | G02B 6/52 254/134.4 |
| 8,663,528 | B2 * | 3/2014 | Jenkins | B65G 15/14 100/153 |
| 8,775,102 | B2 * | 7/2014 | Heatley | G02B 6/52 702/56 |
| 10,875,747 | B2 * | 12/2020 | Borøy | B66D 3/003 |
| 2005/0006425 | A1 * | 1/2005 | Enyedy | B65H 51/10 226/190 |
| 2017/0225920 | A1 * | 8/2017 | Konate | B65H 51/105 |
| 2019/0165554 | A1 * | 5/2019 | Griffioen | H02G 1/086 |
| 2024/0353647 | A1 * | 10/2024 | Wacinski | G02B 6/50 |

* cited by examiner

APPARATUS FOR LAYING AN OPTIC CABLE INTO A DUCT

CROSS-REFERENCE TO RELATED APPLICATIONS

The present application is a filing under 35 U.S.C. 371 as the National Stage of International Application No. PCT/EP2022/072919, filed Aug. 17, 2022, entitled "APPARATUS FOR LAYING AN OPTIC CABLE INTO A DUCT," which claims priority to Swiss Application No. CH070178/2021 filed with the Intellectual Property Office of Switzerland on Aug. 17, 2021, both of which are incorporated herein by reference in their entirety for all purposes.

The present invention generally relates to an apparatus for laying an optic cable into a duct.

Conventionally, an apparatus with two-belt conveyers for installing a cable into a duct is known as shown in U.S. Pat. No. 8,720,030. The apparatus comprises driving means with belts and an airbox for supplying compressed air so that the cable and air enters the duct.

With respect to the cable installation with the above apparatus, there might be a problem related to buckling of a cable between the driving means and the air box or in the duct. Conventionally, the cable is protected by limiting energy supplied to a motor of the conveyer or torque supplied to a drive pully of the conveyer.

Objective of the present invention is to provide an apparatus for laying an optic cable which can achieve smooth conveyance of a cable preventing the buckling of a cable.

In the above aim, a first aspect of the invention relates to an apparatus for laying an elongated element such as an optic cable into a duct, comprising:

- a driving unit with a two-belt conveyer for driving the elongated element into the duct, forming an inlet part into which the cable is inserted in the driving unit and an outlet part from which the elongated element is sent out of the driving unit, and
- a fiber protecting unit for the elongated element, wherein the fiber protecting unit comprises at least one of:

- a precise clamping force setting means for setting a clamping force exerted by the two-belt conveyers onto the cable so as to allow slippage between the elongated element and two-belt conveyers during the driving of the elongated element into the duct and before an actual buckling force exceeds a predetermined buckling force, and/or
- non-parallel belt setting system, for setting the two-belt conveyers in a non-parallel fashion during driving of the elongated element into the duct and/or
- stepped belts having a stepped contact surface with the elongated element, when seen in a transverse direction of the elongated element.

The apparatus according to the above embodiments is arranged with a protecting unit so as to avoid damage or buckling to the elongated element.

Indeed:

- the precise clamping force setting means can be used to finely adjust a slippage between the two-belt conveyor and the elongated element so that buckling can be avoided,
- the non-parallel belt setting means can be used to ensure that at an outlet of the driving unit, the elongated element is actually pinched so as to minimize the free distance between the driving unit and the duct entry to avoid buckling,

- the stepped belts provide lateral guiding to the elongated element, so as to minimize the buckling.

In regards to the precise clamping force setting means, a precision system with a micrometric screw can be provided to finely adjust the clamping force. In particular, the clamping can be adjusted with a pitch of 0.1 mm±0.02 mm.

According to an embodiment, the two-belt conveyer comprises:

- an upper belt conveyer including a first drive roller a first idler roller and a first flexible belt,
- a lower belt conveyer including a second drive roller a second idler roller and a second flexible belt,
- wherein a lower surface of the first flexible belt and an upper surface of the second flexible belt extend in non-parallel to form a gap therebetween that gradually narrows towards the outlet part and wherein a clamping force F is configured to be imparted to the elongated element at a position between the first and second drive rollers.

According to an embodiment, the lower surface of the first flexible belt defined between the first drive roller the first idler roller is planar and/or rectilinear. According to an embodiment, the upper surface of the second flexible belt defined between the second drive roller the second idler roller is planar and/or rectilinear. In other words, the pinching surfaces of non-parallel belts are progressively pinching the elongated element as they are within or comprised in inclined planes.

According to an embodiment, the first drive roller and the first idler roller are defining two ends or extremities of the upper belt conveyer. According to an embodiment, the upper belt conveyer comprises intermediate rollers arranged between the first drive roller and the first idler roller. According to an embodiment, the intermediate rollers are tangent to a tangent line joining the first drive roller and the first idler roller, so as to maintain the first flexible belt within a lower plane defining or comprising the lower surface of the first flexible belt.

According to an embodiment, the second drive roller and the second idler roller are defining two ends or extremities of the lower belt conveyer. According to an embodiment, the lower belt conveyer comprises intermediate rollers arranged between the second drive roller and the second idler roller. According to an embodiment, the intermediate rollers are tangent to a tangent line joining the second drive roller and the second idler roller, so as to maintain the second flexible belt within a upper plane defining or comprising the upper surface of the second flexible belt.

According to an embodiment:

- the first and the second idler roller and
- the first and second drive rollers, are respectively disposed in a manner that both the first and second flexible belts apply a contact pressure to the cable which is greater at the outlet part side than at the inlet part side. According to the above embodiment, the driving surfaces of the belts (which are in regards to each other to pinch or contact the elongated element) are not parallel. In other words, it is ensured that the elongated element is effectively pinched as close as possible to the entry of the duct or of the pressure box. Therefore, the free distance (between driving unit and entry of duct or pressure box), along which there is no support to the elongated element is minimized, so that buckling is minimized as well.

According to an embodiment, the two-belt conveyer comprises:

- an upper belt conveyer including a first drive roller a first idler roller and a first flexible belt, a lower belt conveyer including a second drive roller a second idler roller and a second flexible belt, wherein the upper belt conveyer is configured to change an angle of a lower surface of the first flexible belt whereas the lower belt conveyer is configured to change an angle of an upper surface of the second flexible belt in accordance with a diameter of the elongated element. The apparatus comprises angle setting means, to adjust the relative angle or inclination between the two driving belts. In particular, the relative angle can be set within a range of values above 0° and below 5°, preferably below 2.5° and more preferably around 1°.

According to an embodiment, the apparatus further comprises elastic elements for adjusting clamping force.

According to an embodiment, the two-belt conveyer comprises:

an upper belt conveyer including a first drive roller a first idler roller and a first flexible belt the first flexible belt being formed as a stepped belt, and a lower belt conveyer including a second drive roller a second idler roller and a second flexible belt the second flexible belt being formed as a stepped belt, wherein the first flexible belt in a sectional view, comprises:

at least a first and a second and preferably a third horizontal surface and at least a first and preferably a second vertical surface wherein the second flexible belt in a sectional view, comprises:

at least a first and a second and preferably a third horizontal surface and at least a first and preferably a second vertical surface and wherein the flexible belts are configured to laterally guide the elongated element between the second horizontal surfaces and between the first vertical surfaces. According to the above embodiment, the driving belts are stepped (in a transverse cross section), so as to each present two perpendicular surfaces to guide the elongated element. Consequently, the elongated element, when driven by the apparatus, is located between two pairs of parallel surfaces, each belt comprising or providing one surface of each of the pair of the parallel surfaces.

According to an embodiment, the first and second flexible belts extend in parallel along a conveying direction of the elongated element.

According to an embodiment, the first and second flexible belts extend in non-parallel along a conveying direction of the elongated element.

According to an embodiment, when an elongated element is driven by the apparatus:

a gap is present between the first horizontal surface of first flexible belt and third horizontal surface of second flexible belt, and/or a gap is present between the third horizontal surface of first flexible belt and first horizontal surface a of second flexible belt.

According to an embodiment, a distance between the first and second drive rollers is changeable to adjust a clamping force F.

According to an embodiment, the apparatus further comprises an infeed guide near the outlet part Another aspect of the disclosure relates to a method of laying an elongated element such as an optic cable comprising steps of:

inserting a cable into a duct with two-belt conveyers which is configured to clamp and feed the cable and balancing forces of pushing and pulling the cable wherein a force for pushing cable is controlled by adjusting clamping force of the belt conveyers.

According to an embodiment, the method further comprises a step of changing a clamping force for the cable by the belt conveyers to adjust a pushing force of the cable. Adjustment of the clamping force can be done by adjusting a distance between the belts of the belt conveyor, with a micrometric adjusting unit.

According to an embodiment, balancing forces of pushing and pulling the cable includes:

feeding pressurized air into the duct to generate a pulling force to pull the elongated element.

Other features and advantages of the present invention will appear more clearly from the following detailed description of particular non-limitative examples of the invention, illustrated by the appended drawings where:

It is of course understood that obvious improvements and/or modifications for one skilled in the art may be implemented, still being under the scope of the invention as it is defined by the appended claims.

Figure 1:
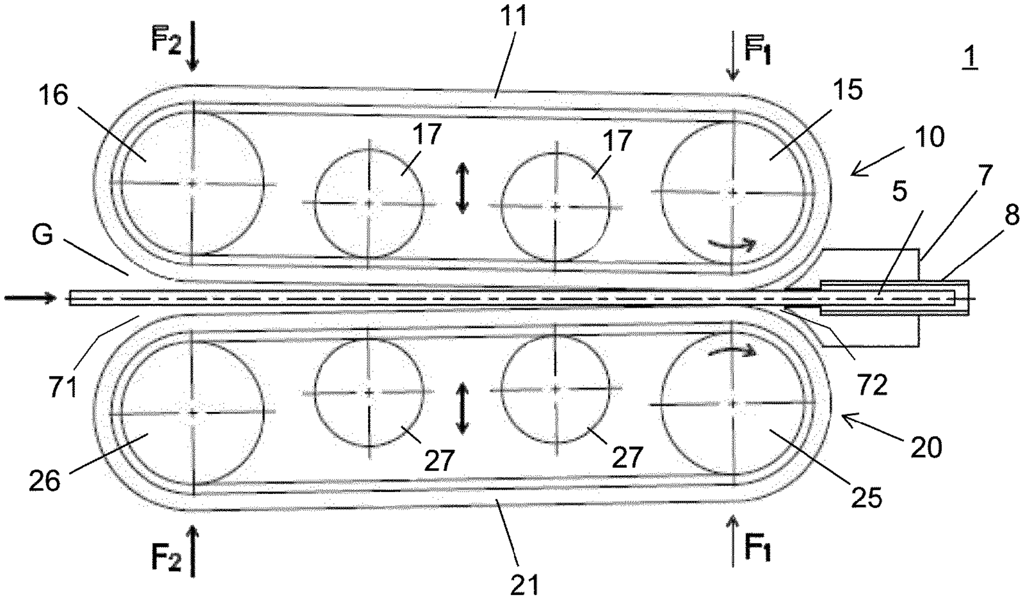
FIG. 1 is a side view of a first embodiment of a cable installation apparatus according to the present invention.

As shown in FIG. 1, a cable installation apparatus 1 in this embodiment comprises a pair of belt conveyers 10, 20 for driving an optic cable 5, a drum (not shown), an infeed guide 7, and a controller (not shown) for controlling an operation of the belt conveyers 10, 20.

The optic cable 5 can has a diameter of 1 mm to 3 mm with low buckling resistance.

As the belt conveyers, an upper belt conveyer 10 and a lower belt conveyer 20 are provided. The upper belt conveyer 10 comprises a first roller 15, a second roller 16, intermediate rollers 17 disposed between the first and second rollers 15, 16 and a continuous belt 11 arranged around the two rollers 15, 16.

Similarly, the lower belt conveyer 20 comprises a first roller 25, a second roller 26, intermediate rollers 27 disposed between the first and second rollers 25, 26 and a continuous belt 21 arranged around the two rollers 25, 26.

The optic cable 5 is fed into a gap G between the continuous belts 11 and 21 and travels towards a duct 8.

The first rollers 15, 25 may be driving rollers, whereas the second rollers 16, 26 may be idler rollers. A motor (not shown) may be operatively connected to each of the driving roller, or a single motor is connected to one or both driving rollers, so that the continuous belt can be driven.

The skilled person would appreciate that it is possible to omit intermediate rollers 17, 27 in an embodiment.

In the embodiment of FIG. 1, the upper belt conveyer 10 and the lower belt conveyer 20 are configured to provide a non-parallel belt setting system as shown in FIG. 1. Specifically, a lower surface of the continuous belt 11 and/or an upper surface of the continuous belt 21 are inclined to form the gap G between the belts gradually narrowing from an inlet part 71 to an outlet part 72.

One can see on FIG. 1 that the lower surface of the continuous belt 11 and that the upper surface of the continuous belt 21 are both straight between the two ends or extremities of the respective belt conveyors. In particular, the intermediate rollers 17, 27 may help to conform (or keep) straight and/or planar the lower surface of the continuous belt 11 and the upper surface of the continuous belt 21.

In another embodiment, only one of the continuous belt 11 and 21 may be non-parallel in relation to a cable feeding direction, whereas the other can be parallel to the cable feeding direction as long as the gap G is gradually narrows towards the duct 8.

As an example, the lower surface of the continuous belt 11 and/or the upper surface of the continuous belt 21 can present an angle above 0° and below 5°, preferably below 2.5° and more preferably around 1°, versus an axis of the optic cable 5.

Continuous belts 11, 21 are, in an example, made of bi-material plastic with rigid tees and coated with an elastomer with a high friction coefficient on the side in contact with the cable. The belt can be driven by toothed pulleys.

The cable installation apparatus 1 further comprises a blowing head (not shown) for supplying compressed air into the duct 8 through which the optic cable 5 is driven. The compressed air flows within the duct 8 to carry the cable 5 by generating drag forces. In other words, pulling force is generated by the pressurized air injected into the duct 8.

On the other hand, pushing force is generated by clamping the cable 5 between two-belts 11, 21. The pushing force of the cable is proportional to the clamping force and the coefficient of the friction. Preferably, clamping force between the two-belts 11, 21 is adjustable. A precision system with a micrometric screw can be provided to finely adjust the clamping force. In particular, the clamping can be adjusted by modifying the distance between the belts with a pitch of 0.1 mm±0.02 mm.

One embodiment of installing the cable 5 with the cable installation apparatus 1 will be described below.

A method of laying the cable in the duct 8 may comprises a step of balancing the forces of pushing and pulling the cable 5. This method allows to manage only one single parameter to protect the cable 5 and can avoid the use of an expensive motor and controller capable of stopping in a few milliseconds, for example.

In particular, a static test can be carried out before installation. The optic cable 5 is placed into the apparatus coupled to a duct of one meter length having its exit blocked, the optic cable 5 being placed in abutment to the blocked exit. The upper belt conveyer 10 and the lower belt conveyer 20 are arranged to not contact the optic cable 5 and the driving motor is switched on. The upper belt conveyer 10 and the lower belt conveyer 20 are progressively moved so as to increase progressively the clamping force. Slippage occurs at the beginning, and clamping force is increase until the cable starts to undulate/buckle. At this stage, the maximum clamping force before buckling is known and can be recorded/applied for serial installation.

In other words, in this embodiment, pushing force against the cable 5 is limited by the use of radial force and sliding occurs between the cable and belt when reaction force to pushing is exceeding the threshold, the cable 5 thus can be protected.

With respect to a cable installation, the buckling force depends on the stiffness of the cable 5 and a distance between the application of the thrust force and the insertion force of the cable 5 in the duct 8.

The non-parallel arrangement of the belts 11, 21 makes it possible to place the point of application of the thrust force at the exit of the belt and to reduce the distance between two points of force application.

In contrast, in a conventional apparatus with two parallel conveyer belts, the tightening is theoretically uniform over the entire cable-belt contact area. Disadvantage in the conventional apparatus is as follows. For small diameter cables (and consequently a low admissible pushing force), the clamping pressure must be very low.

In practice, the clamping pressure is often maximal in the middle of the application points of the forces F1 and F2 (see FIG. 1 as a reference) due to the deflection of the upper belt (caused for example by a loose strand generated between a driven roller and an idler roller). It is then common to produce an unexpected horizontal buckling of the cable before it enters the tube.

With the proposed non-parallel arrangement of the belts 11, 21, the contact zone is positioned to or located at a position as close as possible to the introduction of the cable 5 into the duct 8, therefore a distance between the entry of guide 7 and tightened cable becomes minimal. The non-parallel arrangement can provide a gradual guidance of thrust force from a belt inlet to the tube. It should be kept in mind that belts are generally loose, and in the present application the parallel and non-parallel situation can be assessed by drafting tangent lines between the first rollers 15, 25 and the second rollers 16, 26 respectively. The angle might be measured between these tangent lines, instead of measuring the angle directly between the belts.

Figure 2A:
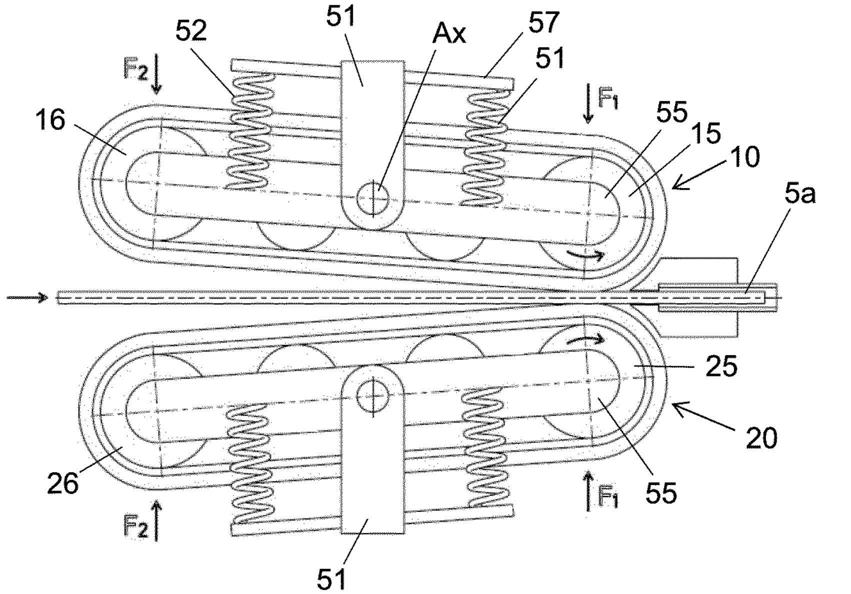
FIG. 2A is a side view of a second embodiment of a cable installation apparatus according to the present invention wherein a smaller diameter cable is being inserted.
Figure 2B:
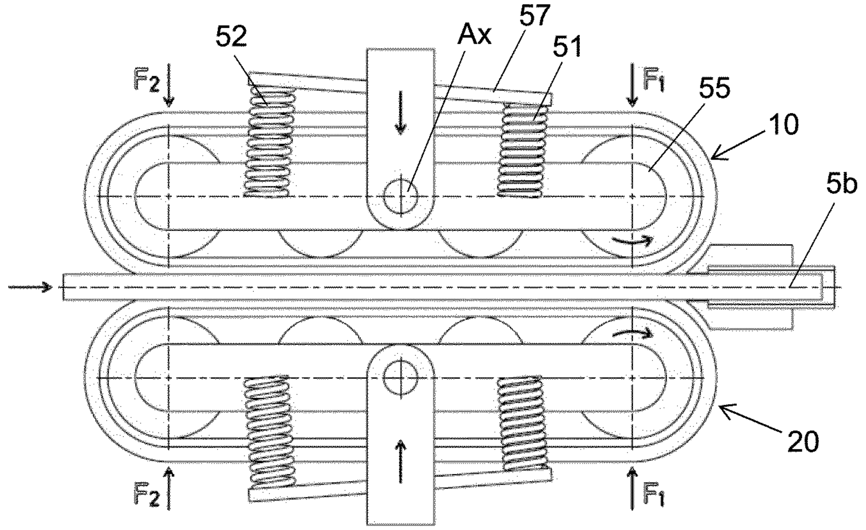
FIG. 2B is a side view of a second embodiment of a cable installation apparatus according to the present invention wherein a larger diameter cable is being inserted.

FIGS. 2A and 2B depict a second embodiment of an apparatus for laying an optic cable into a duct. The apparatus in this embodiment comprises upper and lower belt conveyers 10, 20 for driving an optic cable. In FIG. 2A a smaller diameter cable 5*a* is depicted, whereas in FIG. 2B a larger diameter cable 5*b* is depicted.

The apparatus comprises a support frame 51 and a movable support member 55 which is pivotably supported by the respective support frame 51. The support member 55 is configured to pivot around a horizontal pin Ax. Two coil springs 51, 52 are provided between the movable support member 55 and a supporting plate 57 positioned away from the support member 55. One coil spring 51 is positioned near the first roller 15 and the other 52 is positioned near the second roller 16. The supporting plate is inclined versus the axis of the optic cable Sa, so that the belts are naturally non-parallel. Alternatively, long coil spring 51 can be provided at the cable output end (at the rollers 15, 25 side) and short coil spring 52 can be provided at the cable input end (at the rollers 16, 26 side).

For installation of the small diameter cable 5*a* shown FIG. 2*a*, the cable 5*a* is supported or pinched at a position close or in regards of the first rollers 15, 25. Continuous belt does not contact to the cable 5*a* at a position of the second rollers 16, 26. Clamping force (F1) can be adjusted by means of the coil spring 51, or by moving the whole upper conveyor belt 10 downwards.

In this embodiment, initially the clamping is concentrated only close to the infeed guide 7.

For installation of the larger diameter cable 5*b*, the cable 5*b* is guided entirely between the first and second rollers as shown in FIG. 2B. Even in this case, thanks to a configuration of the coil springs 51, 52, the clamping force F1 is greater than force F2 at the opposite side.

The skilled person would appreciate that it is possible to use two or more springs for the coil spring 51 and/or the coil spring 52. In addition, any kind of spring other than coil spring can also be used.

Figure 3:
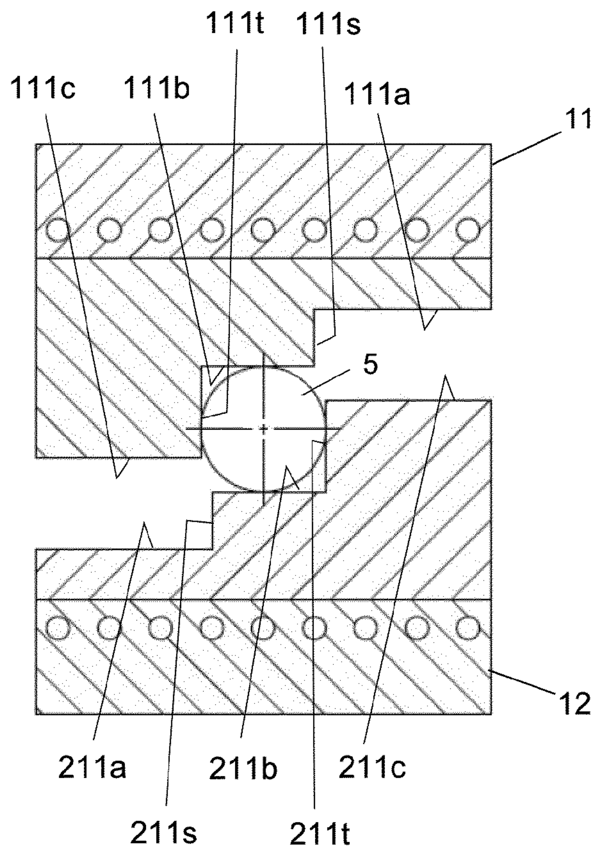
FIG. 3 is a sectional view of a third embodiment of a cable installation apparatus (only a pair of conveyer belts and a cable are shown).
Figure 4:
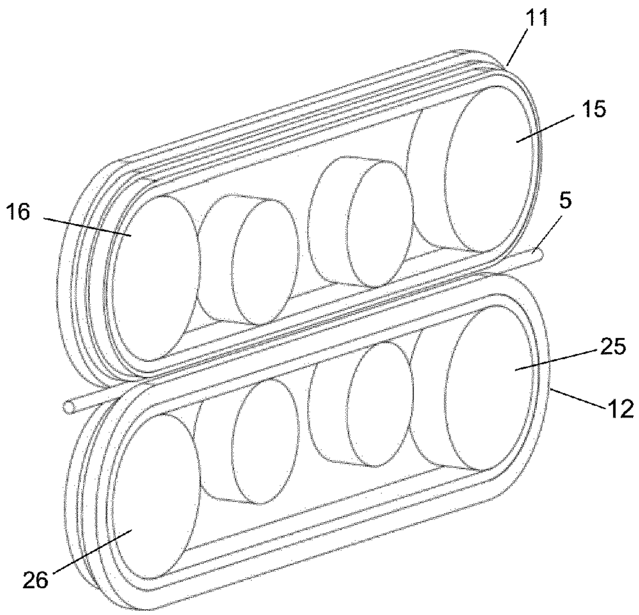
FIG. 4 is a perspective view of the third embodiment (only a pair of conveyers and a cable are shown).

FIGS. 3 and 4 depict a third embodiment of apparatus for laying an optic cable into a duct. The apparatus comprises a pair of stepped belts 11, 12 arranged between the first roller 15, 25 and the second roller 16, 26 respectively. As a way of example, the stepped belts 11, 12 may be in parallel arrangement in relation to a cable feeding direction.

As shown in FIG. 3, each belt 11, 12 comprises:

a first horizontal surface respectively 111*a*, 221*a*, a second horizontal surface respectively 111*b*, 211*b*, a third horizontal surface respectively 111*c*, 211*c*, a first vertical surface respectively 111*s*, 211*s*, a second vertical surface respectively 111*t*, 211*t*.

The second horizontal surfaces 111*b*, 211*b* are facing to each other and configured to contact to the cable 5 and the pair of second vertical surfaces 111*t*, 211*t* may contact to the cable 5. To avoid interference, in FIG. 3 the second horizontal surfaces 111*b*, 211*b* are shorter than a diameter of the optic cable 5, and the same applies to the second vertical surfaces 111*t*, 211*t*: they are shorter than the diameter of optic cable 5.

Use of the belts with two opposite half grooves to guide the cable 5 can avoid buckling of the cable, as the optic cable 5 is located between two pairs of perpendicular surfaces (first belt 11 provides a pair of perpendicular surfaces 111*b*, 111*t*, and second belt 12 provides a pair of perpendicular surfaces 211*b*, 211*t*) arranged to provide straight abutment or guidance for limiting buckling or undulations, in two perpendicular axes (horizontal and vertical directions).

The belts 11, 12 of FIG. 3 and FIG. 4 may also be used in the non-parallel conveyor of FIG. 1. It provides an improved guiding of the optic cable 5 laterally with the stepped belts 11, 12 and the gradual pinching progressively ensures that the lateral guiding via second vertical surfaces respectively 111*t*, 211*t* is gentle, progressive and efficient while the pinching force increases, which ends into an efficient and safe driving.

In summary, according to this present disclosure, the installation of cable 5 can be improved in terms that:

Firstly, the stepped belt with their second vertical surfaces guide the optic cable in the horizontal plane beyond the point of contact: buckling is further reduced.

Secondly by ensuring that the gap is created/located at the entry of the belts, due to the non-parallel arrangement of the belts.

Thirdly, by increasing the clamping capacity limited by the small clearance between the belts after the application of the clamping force. The service life of the belts is thus increased, as wear is compensated for by an increase in the clamping stroke.

The invention claimed is:

1. An apparatus for laying an elongated element such as an optic cable into a duct, comprising:

a driving unit with a two-belt conveyer for driving the elongated element into the duct, forming an inlet part into which the cable is inserted in the driving unit and an outlet part from which the optic cable is sent out of the driving unit, and a fiber protecting unit for the elongated element, wherein the fiber protecting unit comprises at least a:

non-parallel belt setting system, for setting the two-belt conveyers in a non-parallel fashion during driving of the optic cable into the duct, wherein the two-belt conveyer comprises:

an upper belt conveyer including a first drive roller, a first idler roller and a first flexible belt, a lower belt conveyer including a second drive roller, a second idler roller and a second flexible belt, wherein a lower surface of the first flexible belt and an upper surface of the second flexible belt extend in non-parallel to form a gap therebetween that gradually narrows towards the outlet part, and wherein a clamping force is configured to be imparted to the elongated element at a position between the first and second drive rollers.

2. The apparatus according to claim 1, wherein:

the first and the second idler roller and the first and second drive rollers, are respectively disposed in a manner that both the first and second flexible belts apply a contact pressure to the elongated element which is greater at the outlet part side than at the inlet part side.

3. The apparatus according to claim 1, wherein the upper belt conveyer is configured to change an angle of a lower surface of the first flexible belt whereas the lower belt conveyer is configured to change an angle of an upper surface of the second flexible belt in accordance with a diameter of the optic cable.

4. The apparatus according to claim 3, further comprising elastic elements for adjusting clamping force (F1, F2).

5. The apparatus according to claim 1, where the first flexible belt and the second flexible belt are each formed as a stepped belt, wherein the first flexible belt, in a sectional view, comprises:

at least a first and a second and preferably a third horizontal surface and at least a first and preferably a second vertical surface, wherein the second flexible belt, in a sectional view, comprises:

at least a first and a second and preferably a third horizontal surface and at least a first and preferably a second vertical surface, and wherein the flexible belts are configured to laterally guide the elongated element between the second horizontal surfaces and between the second vertical surfaces.

6. The apparatus according to claim 5, wherein the first and second flexible belts extend in non-parallel along a conveying direction of the elongated element.

7. The apparatus according to claim 6, wherein, when an elongated element is driven by the apparatus:

a gap is present between the first horizontal surface of first flexible belt and third horizontal surface of second flexible belt, and/or a gap is present between the third horizontal surface of first flexible belt and first horizontal surface of second flexible belt.

8. The apparatus according to claim 1, wherein a distance between the first and second drive rollers is changeable to adjust a clamping force (F1).

9. The apparatus according to claim 1, further comprising an infeed guide near the outlet part.

10. The apparatus according to claim 1, comprising a precise clamping force setting means for setting a clamping force exerted by the two-belt conveyers onto the cable so as to allow slippage between the optic cable and two-belt conveyers during the driving of the optic cable into the duct and before an actual buckling force exceeds a predetermined buckling force.

11. The apparatus according to claim 5, comprising stepped belts having a stepped contact surface with the optic cable, when seen in a transverse direction of the optic cable.

* * * * *